(12) United States Patent
Uemura et al.

(10) Patent No.: US 11,549,155 B2
(45) Date of Patent: Jan. 10, 2023

(54) REDUCED IRON PRODUCTION METHOD AND PRODUCTION APPARATUS

(71) Applicant: Kobe Steel, Ltd., Kobe (JP)

(72) Inventors: Tomoki Uemura, Kobe (JP); Koji Tokuda, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 902 days.

(21) Appl. No.: 16/321,522

(22) PCT Filed: Jul. 7, 2017

(86) PCT No.: PCT/JP2017/025017
§ 371 (c)(1),
(2) Date: Jan. 29, 2019

(87) PCT Pub. No.: WO2018/025585
PCT Pub. Date: Feb. 8, 2018

(65) Prior Publication Data
US 2019/0169704 A1 Jun. 6, 2019

(30) Foreign Application Priority Data
Aug. 1, 2016 (JP) .............................. JP2016-151089

(51) Int. Cl.
*C21B 3/08* (2006.01)
*C21B 13/00* (2006.01)

(52) U.S. Cl.
CPC ............ *C21B 13/0046* (2013.01); *C21B 3/08* (2013.01); *C21B 13/0006* (2013.01);
(Continued)

(58) Field of Classification Search
CPC ............ C21B 13/0006; C21B 13/0046; C21B 2400/026; C21B 2400/044; C21B 2400/056; C21B 3/08
(Continued)

(56) References Cited

U.S. PATENT DOCUMENTS

2001/0049980 A1* 12/2001 Negami .............. C21B 13/0046
75/504
2015/0203931 A1 7/2015 Sugiyama et al.

FOREIGN PATENT DOCUMENTS

JP 10-147806 A 6/1998

OTHER PUBLICATIONS

International Search Report dated Sep. 5, 2017, in PCT/JP2017/025017 filed on Jul. 7, 2017.

* cited by examiner

*Primary Examiner* — Jie Yang
(74) *Attorney, Agent, or Firm* — Oblon, McClelland, Maier & Neustadt, L.L.P.

(57) ABSTRACT

A reduced iron production method includes: a reduction-step of producing reduced iron by heating an agglomerate containing iron oxide and carbonaceous reducing agent to reduce the iron oxide and solidifying a product produced by melting the reduced iron; a first-magnetic-separation-step of separating, among granular metallic iron, first slag, and second slag containing more fine-granular metallic iron than the first slag that are contained in the product, at least the granular metallic iron from the first slag by use of a first magnetic separator to separate first slag containing substance and a granular metallic iron containing substance from each other; a second-magnetic-separation-step of separating the second slag from the first slag containing substance or the granular metallic iron containing substance by use of a second magnetic separator having attraction force different from attraction force of the first magnetic separator; and a crushing-step of crushing the second slag.

7 Claims, 10 Drawing Sheets

(52) U.S. Cl.
CPC .. *C21B 2400/026* (2018.08); *C21B 2400/044* (2018.08); *C21B 2400/056* (2018.08)

(58) Field of Classification Search
USPC .......................................................... 148/325
See application file for complete search history.

|  | FIRST SLAG | | SECOND SLAG |
|---|---|---|---|
| F | S | FS1 | FS2 |
| (hatched oval) | (empty oval) | (oval with small hatched circle) | (oval with larger hatched circle) |
| GRANULAR IRON | SLAG | FINE-GRANULAR IRON CONTAINING SLAG | |

REDUCED IRON PRODUCTION METHOD AND PRODUCTION APPARATUS

TECHNICAL FIELD

The present invention relates to a reduced iron production method and a reduced iron production apparatus.

BACKGROUND ART

There has conventionally been known a method for producing reduced iron by reducing iron oxide in the process of heat-melting an agglomerate containing an iron oxide containing substance and a carbonaceous reducing agent in a heating furnace. In such a method, various techniques have been proposed in order to efficiently recover reduced iron (that is, metallic iron to be a product) from a discharged material discharged from the heating furnace.

For example, Patent Literature1 proposes a technique that separates granular metallic iron contained in a discharged material discharged from a heating furnace from slag by a magnetic separator in order to extract the granular metallic iron to be a product from the discharged material.

Further, Patent Literature 2 proposes, as another conventional technique for separating and recovering metallic iron, a technique including passing a discharged material discharged from a heating furnace through a sieve, crushing the whole discharged material on the sieve by use of a crusher, and sorting a crushed material obtained by the crushing by use of a separator such as a magnetic separator to recover metallic iron to be a product.

However, in the production method described in Patent Literature 1, when a large amount of granular metallic iron with slag adhered or slag containing fine-granular metallic iron is produced due to unfavorable production conditions of reduced iron, the ratio of slag mixed into a group of metallic iron extracted by the magnetic separator increases. This makes it difficult to separate and recover high-purity granular metallic iron. The existence of slag containing fine-granular metallic iron in this manner (that is, the fine-granular iron containing slag) is not taken into consideration in a conventional reduced iron production field.

In the production method described in Patent Literature 2, the whole discharged material discharged from the heating furnace is crushed by use of the crusher. Thus, granular metallic iron that contains no impurity and can originally be shipped as a product in the discharged material is also wastefully crushed. Further, granular metallic iron is harder than the other substance (e.g., slag) in the discharged material. Thus, the granular metallic iron is difficult to crush, and crushing the granular metallic iron imposes a large load on equipment such as the crusher.

CITATION LIST

Patent Literature

Patent Literature 1: JP 10-147806 A
Patent Literature 2: JP 2014-43646 A

SUMMARY OF INVENTION

It is an object of the present invention to provide a reduced iron production method and a reduced iron production apparatus that are capable of recovering high-purity metallic iron with high efficiency and reducing the load of equipment for crushing.

In order to recover high-purity metallic iron with high efficiency and reduce the load of equipment which performs crushing, inventors of the present invention have focused on the existence of slag containing fine-granular metallic iron, that is, the fine-granular iron containing slag. Specifically, the inventors have conceived extracting not only granular metallic iron, but also the fine-granular iron containing slag containing a large amount of fine-granular metallic iron separately from the granular metallic iron by performing two-stage sorting. It is possible to achieve both efficient recovery of high-purity metallic iron and reduction of the load of crushing equipment at the same time by extracting the fine-granular metallic iron by crushing the fine-granular iron containing slag extracted in this manner.

A provided reduced iron production method includes: a reduction step of producing reduced iron by heating an agglomerate containing iron oxide and a carbonaceous reducing agent in a heating furnace to reduce the iron oxide, producing a product containing granular metallic iron, a first slag, and a second slag containing more fine-granular metallic iron than the first slag by melting the reduced iron, and then solidifying the product; a first magnetic separation step of separating, among the granular metallic iron and the second slag that are contained in the product, at least the granular metallic iron from the first slag by use of a first magnetic separator to separate a first slag containing substance containing the first slag and a granular metallic iron containing substance containing the granular metallic iron from each other; a second magnetic separation step of separating the second slag from a substance containing the second slag among the first slag containing substance and the granular metallic iron containing substance that are separated from each other by the first magnetic separation step by use of a second magnetic separator having an attraction force different from an attraction force of the first magnetic separator; and a crushing step of crushing the second slag.

Further, a reduced iron production apparatus provided by the present invention includes: a heating furnace that produces reduced iron by heating an agglomerate containing iron oxide and a carbonaceous reducing agent to reduce the iron oxide, produces a product containing granular metallic iron, a first slag, and a second slag containing more fine-granular metallic iron than the first slag by melting the reduced iron, and then solidifies the product; a first magnetic separator that separates, among the granular metallic iron and the second slag that are contained in the product, at least the granular metallic iron from the first slag to separate a first slag containing substance containing the first slag and a granular metallic iron containing substance containing the granular metallic iron from each other; a second magnetic separator that is disposed on a downstream side of the first magnetic separator and separates the second slag from a substance containing the second slag among the first slag containing substance and the granular metallic iron containing substance that are separated from each other by the first magnetic separator by an attraction force different from an attraction force of the first magnetic separator; and a crushing unit that crushes at least the second slag.

DESCRIPTION EMBODIMENTS

Hereinbelow, an embodiment for carrying out the reduced iron production method and the reduced iron production apparatus of the present invention will be described in more detail with reference to the drawings. Prior to describing the embodiment, a concept of the present invention and the fine-granular iron containing slag which is an important element in the concept will be described.

As described above, the reduced iron production method according to the present invention is a method for producing reduced iron by heat-melting an agglomerate, which is obtained by agglomerating a mixture of an iron oxide containing substance and a carbonaceous reducing agent, to reduce the iron oxide. The reduced iron production method is characterized in that two-stage sorting is performed on a product which is produced in the process of heat-meting the agglomerate in a reducing furnace (heating furnace). The sorting makes it possible to separate a first slag and a second slag (described below) from granular metallic iron with high separation efficiency. Accordingly, it is possible to recover high-purity metallic iron with high efficiency. Further, the sorting also makes it possible to reduce the load of a grinder by feeding only the first slag or the second slag to the grinder with the granular metallic iron left.

The granular metallic iron described herein is a granular material (so-called nugget) of metallic iron (that is, high-purity iron) which is produced by producing reduced iron by heating an agglomerate to reduce iron oxide contained in the agglomerate and solidifying the reduced iron after melting the reduced iron.

Figure 1:
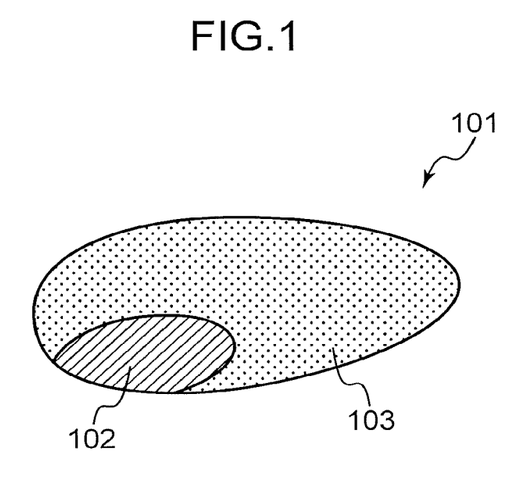
FIG. 1 is a sectional view schematically describing the structure of a fine-granular iron containing slag containing fine-granular metallic iron.

The fine-granular iron containing slag described above includes fine-granular metallic iron 102 and a slag 103 which contains the fine-granular metallic iron 102 therein, for example, like a fine-granular iron containing slag 101 illustrated in FIG. 1. The fine-granular metallic iron 102 is a fine metallic iron grain and contained in the slag 103 without being separated from the slag 103. The slag 103 is a secondary product of metallic iron, and contains calcium oxide, silicon oxide, magnesium oxide, and aluminum oxide. The reduced iron production method described below is based on focusing on the fine-granular iron containing slag 101 as described above, and makes it possible to efficiently recover the fine-granular metallic iron 102 from the fine-granular iron containing slag 101 containing a large amount of fine-granular metallic iron 102.

Figure 2A:
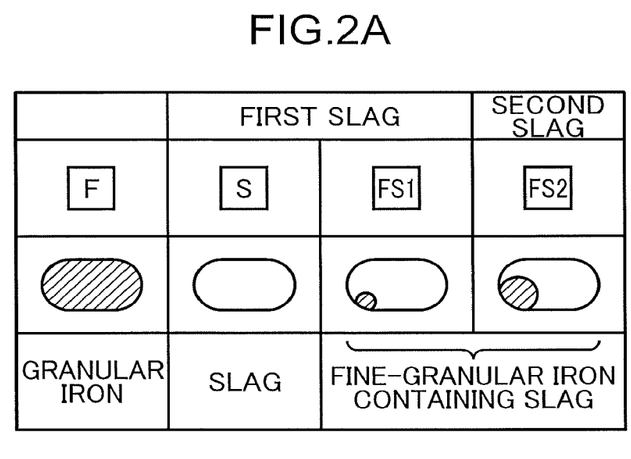
FIG. 2A is a diagram illustrating signs and schematic display representing granular metallic iron, a slag, and fine-granular iron containing slags which are contained in a product produced by a reduced iron production method of the present invention.

FIG. 2A illustrates signs and schematic display for representing granular metallic iron, a slag, and fine-granular iron containing slags which are contained in a product produced by a reduction step in the reduced iron production method. The product produced by the above heat-melting is classified into four kinds illustrated in FIG. 2A: granular metallic iron F, a slag S, and two kinds of fine-granular iron containing slags FS1, FS2. The fine-granular iron containing slags FS1, FS2 both contain fine-granular metallic iron. The fine-granular iron containing slag FS2 contains more fine-granular metallic iron than the fine-granular iron containing slag FS1. For example, the weight ratio of fine-granular metallic iron in the fine-granular iron containing slag FS2 is 3 to 15%, for example, approximately 7%, and the weight ratio of fine-granular metallic iron in the fine-granular iron containing slag FS1 is approximately less than 3%. On the other hand, the slag S contains no fine-granular metallic iron. The slag S and the fine-granular iron containing slag FS1 may be discharged (e.g., discarded) to the outside of a system and correspond to the first slag in the present invention. The fine-granular iron containing slag FS2 corresponds to the second slag in the present invention.

Figure 2B:
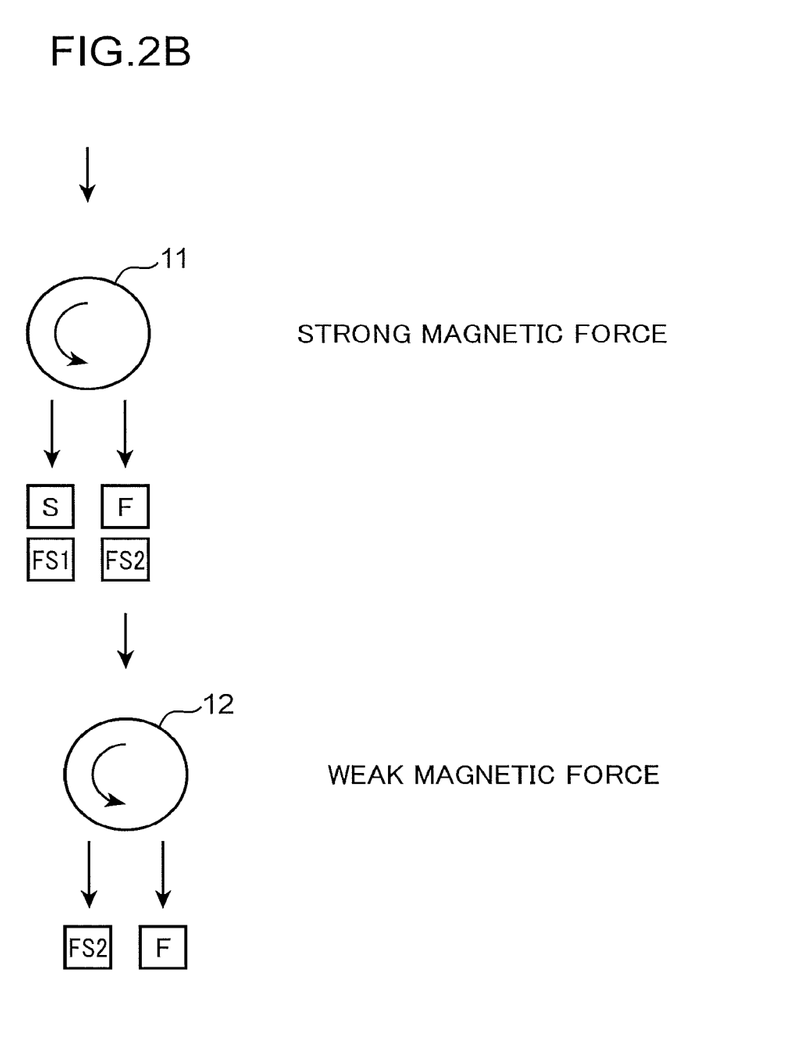
FIG. 2B is a diagram illustrating two-stage sorting which separates the granular metallic iron, the fine-granular iron containing slag containing a large amount of fine-granular metallic iron, and a group of the slag and the fine-granular iron containing slag containing a small amount of fine-granular metallic iron for being discharged to the outside of a system by use of a first magnetic separator having a strong magnetic force and a second magnetic separator having a weak magnetic force.

For example, as illustrated in FIG. 2B, it is possible to separate the product into three groups, that is, the granular metallic iron F, the slag S and the fine-granular iron containing slag FS1 (first slag), and the fine-granular iron containing slag FS2 (second slag) by performing two-stage sorting by magnetic separation on the product by use of a first magnetic separator 11 and a second magnetic separator 12 which have different attraction forces. In the embodiment illustrated in FIG. 2B, the first magnetic separator 11 having a strong magnetic force is used as a first-stage magnetic separator. The purpose thereof is to recover an iron content from the products as soon as possible. In other words, the purpose is to separate slag hardly containing an iron content from the product. The second magnetic separator 12 having a weak magnetic force is used as a second-stage magnetic separator. The purpose thereof is to separate a ferromagnetic product nugget which is easily attracted even by a weak magnetic force from the other slag containing fine-granular iron and extract the ferromagnetic product nugget from a magnetically attractable material separated by the first magnetic separator 11 in order to increase the purity of granular metallic iron.

The first magnetic separator and the second magnetic separator which are used in the present invention are not limited to the first magnetic separator 11 having a strong magnetic force and the second magnetic separator 12 having a weak magnetic force as illustrated in FIG. 2B. For example, a first magnetic separator 11 having a weak magnetic force and a second magnetic separator 12 having a strong magnetic force as illustrated in FIG. 7 may be used.

Figure 7:
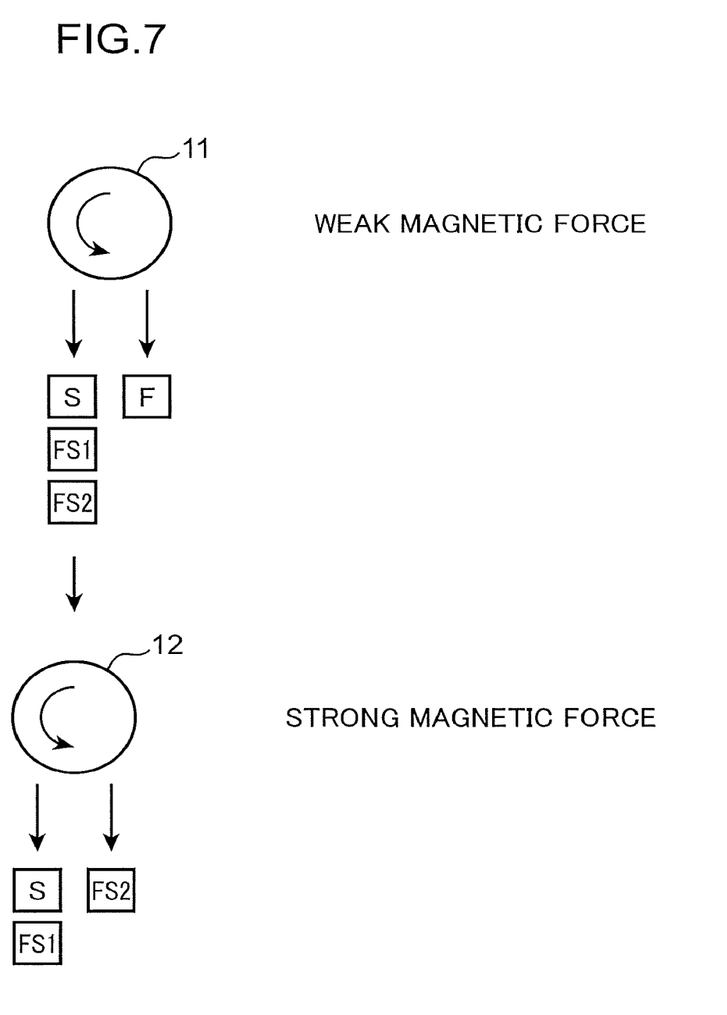
FIG. 7 is a diagram illustrating a reduced iron production method according to a second modification of the embodiment and conceptually illustrating two-stage sorting which separates the granular metallic iron, the fine-granular iron containing slag containing a large amount of fine-granular metallic iron, and a group of the slag and the fine-granular iron containing slag containing a small amount of fine-granular metallic iron for being discharged to the outside of a system by use of a first magnetic separator having a weak magnetic force and a second magnetic separator having a strong magnetic force.

The reduced iron production method conceptually illustrated in FIGS. 2B and 7 includes: a reduction step of producing reduced iron by heating an agglomerate containing iron oxide and a carbonaceous reducing agent in a heating furnace to reduce the iron oxide, producing a product containing the granular metallic iron F, the first slag (the slag S and the fine-granular iron containing slag FS1), and the second slag (the fine-granular iron containing slag FS2) containing more fine-granular metallic iron than the first slag by melting the reduced iron, and then solidifying the product; a first magnetic separation step of separating, among the granular metallic iron F and the second slag (the fine-granular iron containing slag FS2) which are contained in the product, at least the granular metallic iron F from the first slag by use of the first magnetic separator 11 to separate a first slag containing substance containing the first slag and a granular metallic iron containing substance containing the granular metallic iron F from each other; a second magnetic separation step of separating the second slag from a substance containing the second slag among the first slag containing substance and the granular metallic iron containing substance which are separated from each other by the first magnetic separation step by use of the second magnetic separator 12 having an attraction force different from the attraction force of the first magnetic separator 11; and a crushing step of crushing the second slag.

Figure 3:
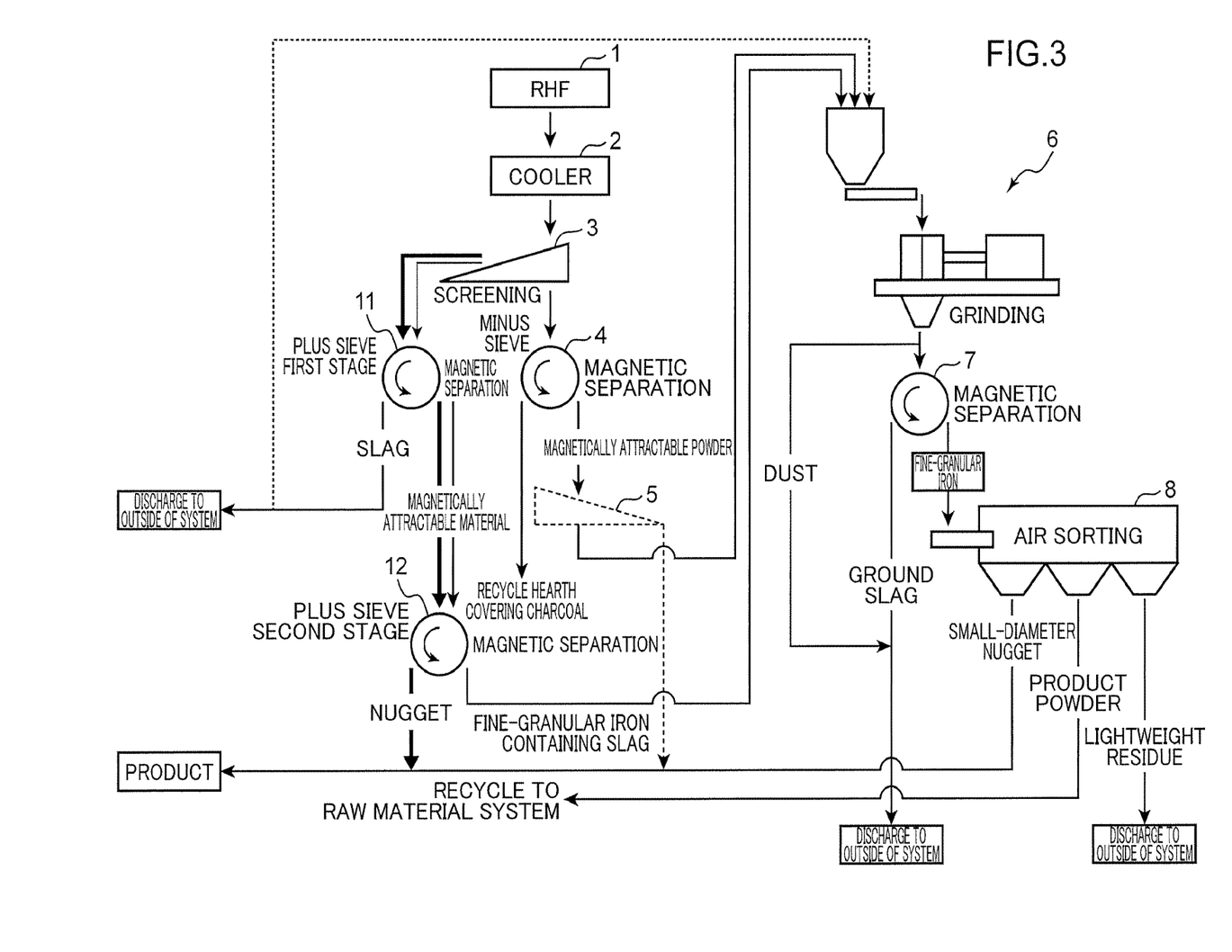
FIG. 3 is a flow sheet illustrating a reduced iron production apparatus according to an embodiment of the present invention.

FIG. 3 illustrates an example of a reduced iron production apparatus for carrying out the reduced iron production method described above. The production apparatus is provided with a rotary hearth furnace (RHF) 1 which is a reducing furnace, a cooler 2 which cools a discharged material from the RHF 1, a sieve 3, the first magnetic separator 11 and the second magnetic separator 12 which sort a plus sieve product discharged from the RHF 1, a minus sieve magnetic separator 4 which sorts a minus sieve discharged material, an auxiliary sieve 5, a grinder 6, a ground product magnetic separator 7, and an air sorter 8 which sorts a group including fine-granular metallic iron sorted by the ground product magnetic separator 7 with air (air sorting).

Figure 4:
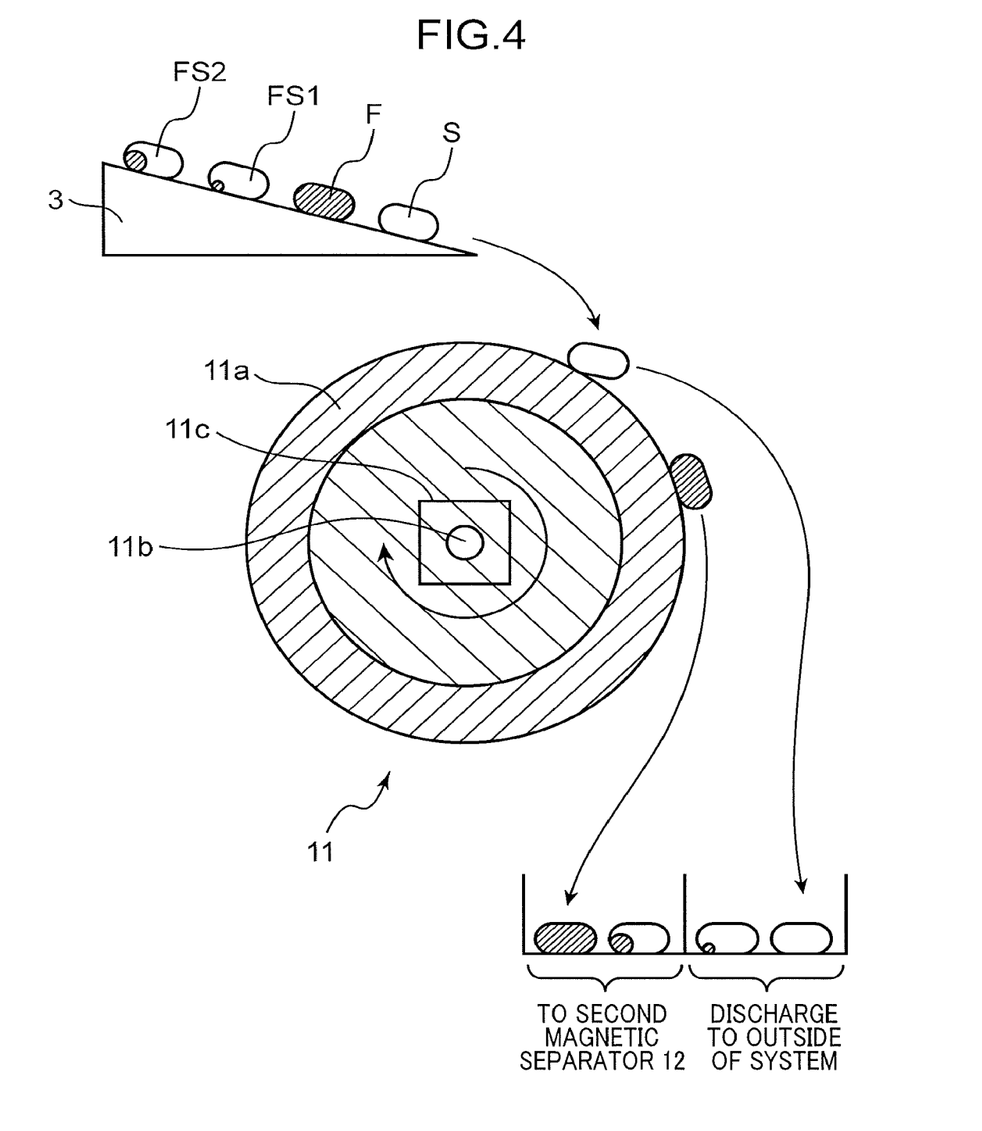
FIG. 4 is a sectional explanatory diagram illustrating a drum magnetic separator which is employed as each of the first magnetic separator and the second magnetic separator of FIG. 3.

The structure of the first magnetic separator 11 and the second magnetic separator 12 is not limited to any structure. Each of the first magnetic separator 11 and the second magnetic separator 12 is, for example, preferably a drum magnetic separator illustrated in FIG. 4, and the drum magnetic separator is advantageous in that the attraction force thereof is changeable. As illustrated in FIG. 4, the first magnetic separator 11, which is the drum magnetic separator, includes a drum 11*a* which has a cylindrical outer peripheral face, a rotation shaft 11*b* which is fixed to a rotation center of the drum 11*a*, and a drive unit 11*c* which rotates the drum 11*a* through the rotation shaft 11*b*. A magnetic force is generated on the outer peripheral face of the drum 11*a*, and a product is attracted to the outer peripheral face by the magnetic force. The second magnetic separator 12 also has the same configuration.

In each of the first magnetic separator 11 and the second magnetic separator 12 as described above, the attraction force acting on the product from the outer peripheral face of the drum (the drum 11*a* in the first magnetic separator 11) is the resultant force of a magnetic force acting on the product inward in the drum radial direction so as to attract the product to the outer peripheral face of the drum and a centrifugal force acting on the product outward in the drum radial direction along with the rotation of the drum. Thus, in each of the first magnetic separator 11 and the second magnetic separator 12, it is possible to change the attraction force which is a force for attracting the product to the outer peripheral face of the drum (the drum 11*a* in the first magnetic separator 11) in any manner by changing the rotation speed of the drum.

In each of the first magnetic separator 11 and the second magnetic separator 12, the outer peripheral face of the drum can be covered with a sheet or a linear which weakens the magnetic force to change the magnetic force itself on the outer peripheral face.

In the first magnetic separator 11 which is the drum magnetic separator, the above product (the granular metallic iron F, the slag S, and the two kinds of fine-granular iron containing slags FS1, FS2) left on the sieve 3 is continuously supplied to the surface of the rotating drum 11*a*. At this time, the granular metallic iron F and fine-granular metallic iron contained in the fine-granular iron containing slag FS2 are strongly attracted toward the center of the drum 11*a* by the attraction force of the first magnetic separator 11. Thus, the above product is sorted, that is, separated into a granular metallic iron containing substance including the fine-granular iron containing slag FS2 containing a large amount of fine-granular metallic iron and the granular metallic iron F and a first slag containing substance including the slag S and the fine-granular iron containing slag FS1 containing a small amount of fine-granular metallic iron, the first slag containing substance being hardly attracted to the drum 11*a*. Among these substances, the granular metallic iron containing substance including the granular metallic iron F and the fine-granular iron containing slag FS2 is fed to the second magnetic separator 12, and the slag S and the fine-granular iron containing slag FS1 are discharged to the outside of the system.

Figure 5:
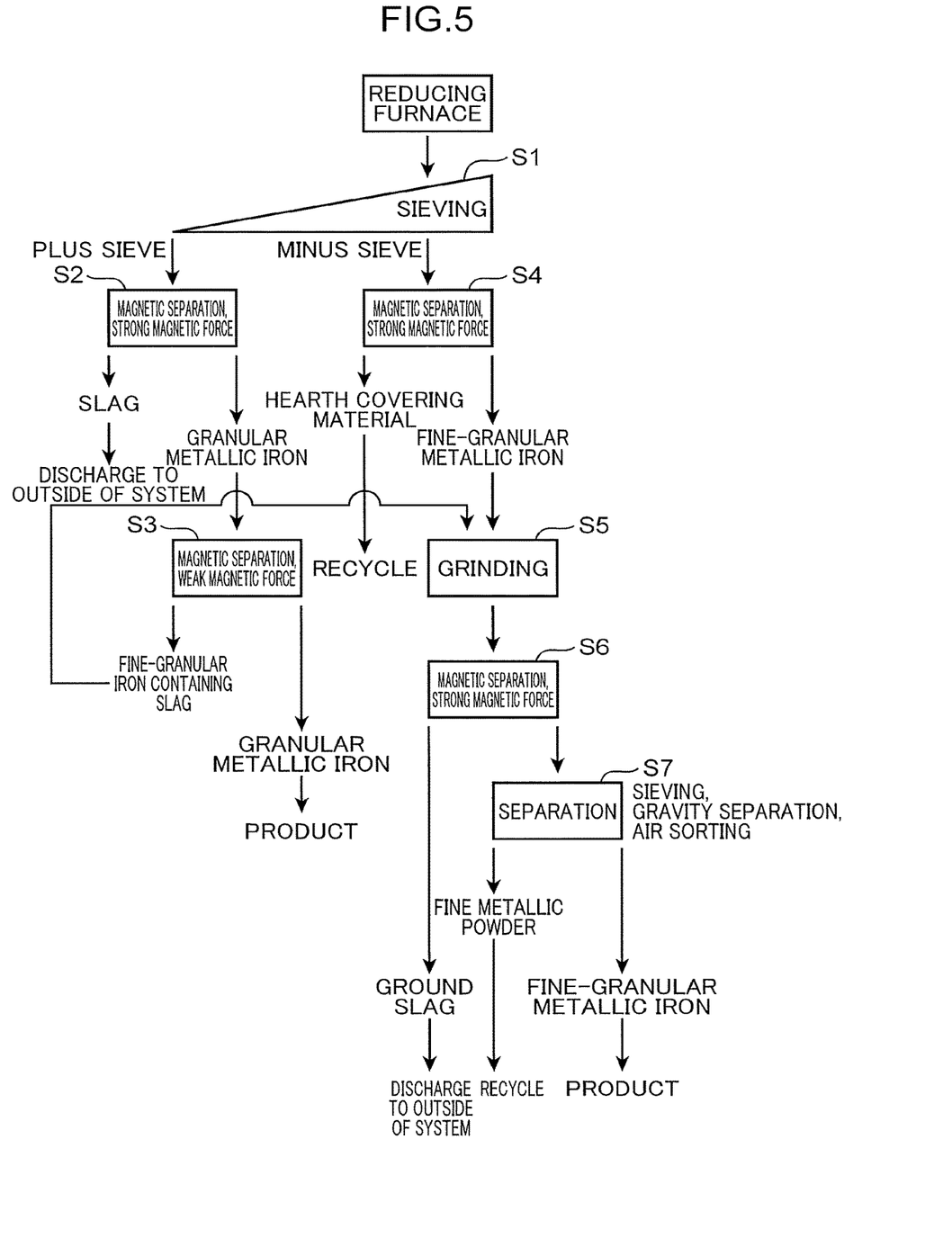
FIG. 5 is a flow chart illustrating a reduced iron production method according to the embodiment.

The reduced iron production method of the present embodiment is, for example, executed in a procedure illustrated in a flow chart of FIG. 5.

First, in a reducing furnace, the reduction step of producing reduced iron by heating an agglomerate containing iron oxide and a carbonaceous reducing agent to reduce the iron oxide and solidifying a product produced by melting the reduced iron is performed. For example, a movable hearth heating furnace (reducing furnace) such as the rotary hearth furnace (RHF) 1 illustrated in FIG. 3 is used as the reducing furnace described above. In the reducing furnace, an agglomerate is heated on a hearth covered with hearth covering charcoal to reduce iron oxide contained in the agglomerate to produce reduced iron, and a molten material containing the reduced iron is solidified. Accordingly, the granular metallic iron F is produced. Further, the slag S and the fine-granular iron containing slags FS1, FS2 are produced as secondary products of the granular metallic iron F. The reducing furnace used in the present invention is not limited to a movable hearth heating furnace (reducing furnace) such as the rotary hearth furnace (RHF) 1, and may be any heating furnace capable of producing reduced iron by heating an agglomerate containing iron oxide and a carbonaceous reducing agent to reduce the iron oxide and solidifying the reduced iron after melting the reduced iron.

A discharged material discharged from the reducing furnace, that is, a product including the granular metallic iron F, the slag S, and the fine-granular iron containing slags FS1, FS2 is fed to the sieve 3 through the cooler 2 of FIG. 3, and in the sieve 3, the product having a predetermined outer diameter or larger is separated from the other discharged material (step S1). The discharged material discharged from the reducing furnace exemplified by the RHF 1 contains a large amount of fine powder, such as hearth covering charcoal and fine-granular metallic iron, the fine powder being smaller than the product. However, separating (that is, screening) the product having a predetermined outer diameter or larger from the fine powder by the sieve 3 makes it possible to reduce the amount of fine powder fed to the first magnetic separator 11 and the second magnetic separator 12.

In the first magnetic separation step which is the first-stage sorting, the product left on the sieve 3 is separated (magnetically separated) into the granular metallic iron containing substance including the granular metallic iron F and the fine-granular iron containing slag FS2 containing a large amount of fine-granular iron and the first slag containing substance including the slag S and the fine-granular iron containing slag FS1 containing a small amount of fine-granular iron by the first magnetic separator 11 having a strong magnetic force, the first magnetic separator 11 being illustrated in the upper section of FIG. 2B (step S2). Among these substances separated from each other by the first magnetic separator 11 having a strong magnetic force in this manner, the first slag containing substance which does not include the fine-granular iron containing slag FS2, that is, the slag S and the fine-granular iron containing slag FS1 are discharged to the outside of the system as unnecessary slag.

The granular metallic iron containing substance including the granular metallic iron F and the fine-granular iron containing slag FS2, the granular metallic iron containing substance being separated by the first magnetic separator 11 described above, is further subjected to the second magnetic separation step which is the second-stage sorting. In the second magnetic separation step, the granular metallic iron F and the fine-granular iron containing slag FS2 are separated (magnetically separated) from each other by the second magnetic separator 12 having a weak magnetic force (step S3). Accordingly, it is possible to extract the granular metallic iron F (nugget) as a product with high purity in the stage prior to the next grinding step S5. The nugget extracted as a product is molten in, for example, an electric furnace and used as a raw material of a steel product. In the second magnetic separator 12 which is the drum magnetic separator, the attraction force thereof can be changed according to a production condition by changing the rotation speed of the drum. Accordingly, it is possible to prevent the fine-granular iron containing slag FS2 from being mixed into the group of the granular metallic iron F.

On the other hand, the discharged material dropped under the sieve 3 is separated into magnetically attractable powder including fine-granular metallic iron and a hearth covering material (specifically, the hearth covering charcoal) by the minus sieve magnetic separator 4 having a strong magnetic force (step S4). The separated hearth covering material is fed to the RHF 1 again and reused. The magnetically attractable powder including fine-granular metallic iron is fed to the grinding step S5.

As illustrated in FIG. 3, the auxiliary sieve 5 may be used to sort fine-granular metallic iron having a predetermined size or larger from the above magnetically attractable powder and extract the fine-granular metallic iron as a product. In this case, the grinder 6 which is located on the downstream side of the auxiliary sieve 5 does not need to grind the fine-granular metallic iron having the predetermined size or larger, which reduces the load of the grinder 6.

The minus sieve magnetic separator 4 magnetically separates a relatively small discharged material (fine-granular metallic iron or hearth covering charcoal) dropped under the sieve. For example, a drum magnetic separator can be used as the minus sieve magnetic separator 4 in a manner similar to the first magnetic separator 11 and the second magnetic separator 12 described above.

The fine-granular iron containing slag FS2 sorted by the second magnetic separator 12 and the magnetically attractable powder including fine-granular metallic iron, the magnetically attractable powder being sorted by the minus sieve magnetic separator 4, are ground by use of the grinder 6 (step S5). The grinder 6 corresponds to the crushing unit in the present invention. For example, a ball mill, a rod mill, a cage mill, or a roller mill is used as the grinder 6. The grinding step S5 may at least crush the fine-granular iron containing slag FS2 to separate fine-granular metallic iron contained in the fine-granular iron containing slag FS2 from the slag adhered to the fine-granular metallic iron. For example, a crusher may be used as the crushing unit. A hammer mill can also be used as the crusher in addition to the ball mill.

The material ground by the grinder 6 is further separated (magnetically separated) into a material containing metallic iron (that is, fine-granular metallic iron and fine metallic powder) and a ground slag containing no metallic iron by the ground product magnetic separator 7 which is a third magnetic separator having a strong magnetic force, the ground product magnetic separator 7 being disposed on the downstream side of the first magnetic separator 11 and the second magnetic separator 12. Accordingly, metallic iron is recovered (step S7). The ground slag is discharged to the outside of the system. The fine-granular metallic iron containing metallic iron and the fine metallic powder containing metallic iron are separated (sorted with air) from each other by the air sorter 8. Specifically, fine-granular metallic iron (so-called small-diameter nugget), fine metallic power (metallic powder that can be reused in a raw material system), and the other lightweight residue are separated from each other. The separation may be performed by use of, for example, a sieve or gravity separation in addition to the air sorter 8. The separated fine-granular metallic iron (small-diameter nugget) is used as a product. The fine metallic powder (product powder) is recycled to the raw material system, that is, reused as a raw material of the agglomerate. The lightweight residue is discharged to the outside of the system.

As described above, according to the reduced iron production method and the reduced iron production apparatus illustrated in the flow chart of FIG. 5, the two-stage sorting by use of the first magnetic separator 11 and the second magnetic separator 12 which have different attraction forces is performed on the product heat-molten in the RHF 1 (reducing furnace), which makes it possible to separate the product into the granular metallic iron F, the first slag (the slag S and the fine-granular iron containing slag FS1 containing a small amount of fine-granular iron), and the fine-granular iron containing slag FS2 (second slag) containing more fine-granular metallic iron than the first slag. The granular metallic iron F is extracted as it is as a product before being introduced into the grinder 6 in the grinding step S5. Thus, the grinder 6 does not need to grind the granular metallic iron F. On the other hand, the fine-granular iron containing slag FS2 (second slag) is ground in the grinding step S5 in order to recover fine-granular metallic iron contained in the fine-granular iron containing slag FS2. However, since the fine-granular iron containing slag FS2 is easily crushed due to its hardness lower than the hardness of the granular metallic iron F, a load applied to equipment such as the grinder 6 by the grinding is extremely small.

Thus, in the above production method, it is possible to achieve both efficient recovery of high-purity metallic iron and reduction of the load of the equipment which performs grinding (or crushing) by recovering the fine-granular metallic iron contained in the fine-granular iron containing slag FS2 together with the granular metallic iron F.

The discharged material discharged from the reducing furnace such as the RHF 1 contains a large amount of fine powder smaller than the product such as granular metallic iron such as hearth covering charcoal and fine-granular metallic iron. However, in the above production method, the product having the predetermined outer diameter or larger is separated (that is, screened) from the fine powder by the sieve 3. This makes it possible to reduce the amount of fine powder fed to the first magnetic separator 11 and the second magnetic separator 12. That is, it is possible to prevent fine metallic powder considerably smaller than granular metallic iron to be a product from being got into an electric furnace for melting metallic iron in aftertreatment and introduce only granular metallic iron having a size that is easy to handle and suitable for melting in the electric furnace into the electric furnace. The fine powder is not suitable as a raw material for electric furnace. This is because the fine powder may be attracted to exhaust air for dust collection when introduced into the electric furnace, which may deteriorate yield. Even if the fine powder is introduced into the electric furnace, the fine powder is easily caught by a molten slag layer on molten metal and resists melting into the molten metal in the electric furnace. Thus, the yield is still deteriorated. Further, in the above production method, it is possible to prevent hearth covering charcoal having a smaller specific gravity and a larger volume than iron from being fed to the first magnetic separator 11 and the second magnetic separator 12. This prevents a reduction in the separation efficiency of the first magnetic separator 11 and the second magnetic separator 12.

In the above production method, the first magnetic separator 11 having a strong magnetic force and the second magnetic separator 12 having a weak magnetic force are used for the two-stage sorting for the product on the sieve. That is, the attraction force of the first magnetic separator 11 is set to be stronger than the attraction force of the second magnetic separator 12. Thus, as illustrated in FIGS. 2B and 5, the first magnetic separator 11 having a strong attraction force separates the product into the granular metallic iron containing substance including the granular metallic iron F and the fine-granular iron containing slag FS2 (second slag) containing a large amount of fine-granular metallic iron and the first slag containing substance including the slag S and the fine-granular iron containing slag FS1 (first slag) containing a small amount of fine-granular metallic iron, and the second magnetic separator 12 having a weak attraction force then separates the granular metallic iron F and the fine-granular iron containing slag FS2 in the granular metallic iron containing substance from each other. In this manner, it is possible to efficiently recover the granular metallic iron F having high purity by the second magnetic separator 12 in the second stage after separating and removing the first slag, which is an unnecessary substance, by the first magnetic separator 11 in the first stage.

Further, the above production method further includes the recovery step S7 of recovering metallic iron by use of the ground product magnetic separator 7, which is the third magnetic separator, after the grinding step S5 by the grinder 6. Thus, it is possible to grind only the fine-granular iron containing slag FS2 (second slag) containing a large amount of fine-granular metallic iron by the grinder 6 and then separate the fine-granular metallic iron contained therein by the ground product magnetic separator 7. Thus, it is possible to efficiently recover the fine-granular metallic iron contained in the fine-granular iron containing slag FS2 (second slag). As a result, the recovery rate of metallic iron is improved.

In the grinding step S5 illustrated in the flow chart of FIG. 5, the fine-granular iron containing slag FS2 magnetically separated by the second magnetic separator 12 having a weak magnetic force in step S3 (refer to FIGS. 2A and 2B) and the fine-granular metallic iron magnetically separated by the minus sieve magnetic separator 4 in step S4 are ground by the common grinder 6. However, the present invention is not limited thereto.

Figure 6:
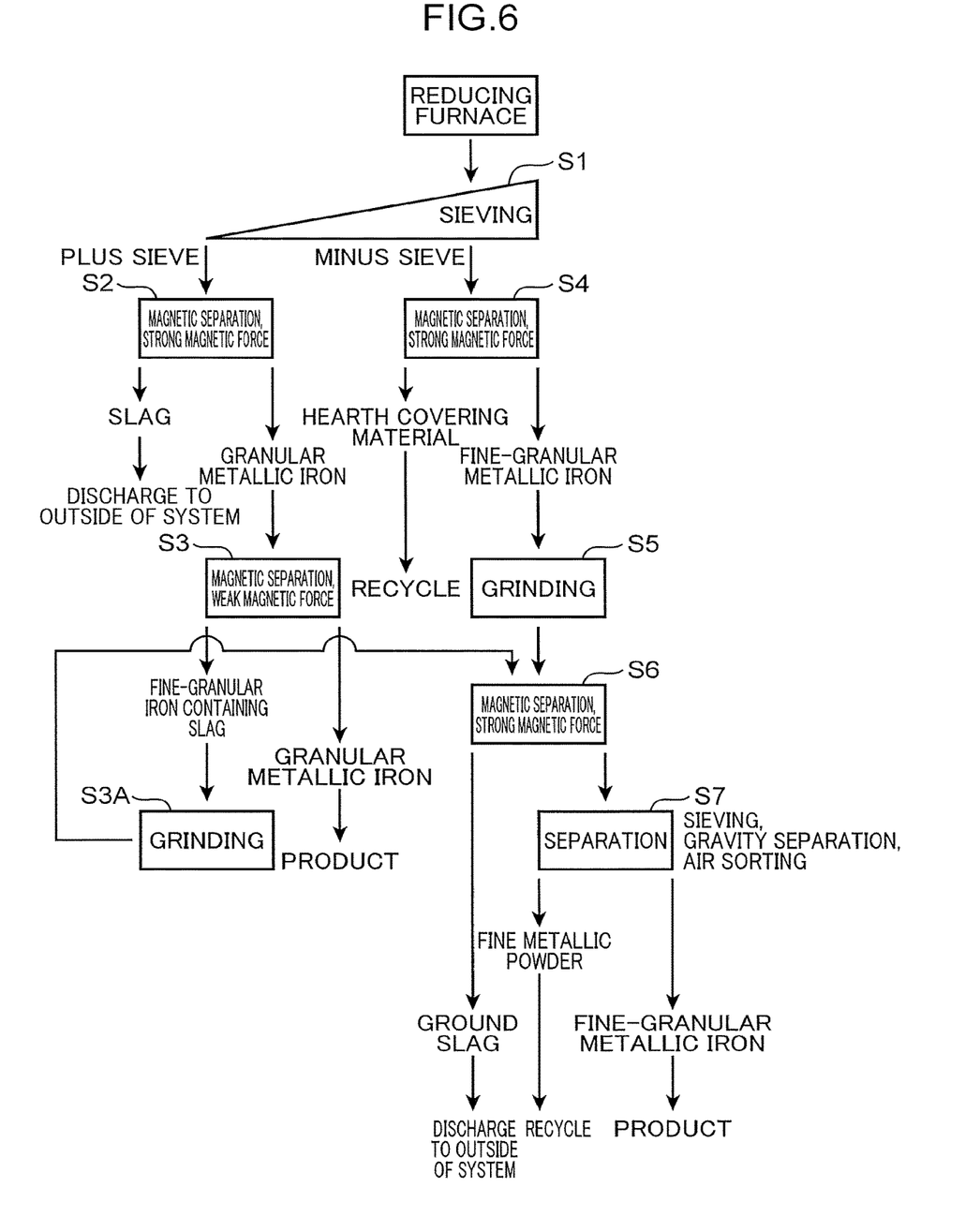
FIG. 6 is a flow chart illustrating a reduced iron production method according to a first modification of the embodiment.

For example, when it is not appropriate to grind the fine-granular iron containing slag FS2 and the fine-granular metallic iron by the common grinder 6 due to a factor such as a difference in the grain size or the hardness, a method illustrated in a flow chart of FIG. 6 may be performed as a first modification. The method includes a grinding step S3A of grinding the fine-granular iron containing slag FS2 magnetically separated in step S3 described above separately from the grinding step S5 of grinding the fine-granular metallic iron magnetically separated in step S4.

In the production method according to the above embodiment, the first magnetic separator 11 having a strong magnetic force and the second magnetic separator 12 having a weak magnetic force are used as illustrated in FIG. 2B for the two-stage sorting for the product on the sieve. However, the present invention is not limited thereto. As a second modification, a first magnetic separator 11 having a weak magnetic force and a second magnetic separator 12 having a strong magnetic force may be used as illustrated in FIG. 7. When the attraction force of the first magnetic separator 11 is weaker than the attraction force of the second magnetic separator 12 in this manner, the granular metallic iron F is separated from the other slags, that is, a group of the slag S and the fine-granular iron containing slag FS1 (first slag) and the fine-granular iron containing slag FS2 (second slag) by the first magnetic separator 11. This makes it possible to increase the purity of granular iron by recovering the granular metallic iron F by the first magnetic separator 11 in the first stage and increase the recovery rate of an iron content by separating the second slag from the first slag by the second magnetic separator 12 in the second stage.

When each of the first magnetic separator 11 and the second magnetic separator 12 is the drum magnetic separator as described above, it is possible to change the centrifugal force by changing the rotation speed of the drum. Thus, it is possible to easily set the attraction force, which is the resultant force of the centrifugal force and the magnetic force, of the first magnetic separator 11 to be weaker than the attraction force of the second magnetic separator 12.

As illustrated in FIG. 7, when the attraction force of the first magnetic separator 11 is set to be weaker than the attraction force of the second magnetic separator 12, the first slag containing substance separated from the granular metallic iron containing substance by the first magnetic separation step, the first slag containing substance containing the second slag, that is, the substance including the group of the slag S and the fine-granular iron containing slag FS1 (first slag) and the fine-granular iron containing slag FS2 (second slag) may be crushed between the first magnetic separation step by the first magnetic separator 11 and the second magnetic separation step by the second magnetic separator 12. In the subsequent stage of the crushing, fine-granular metallic iron contained in the crushed first slag and the crushed second slag can be extracted by the second magnetic separator 12. Further, the content of fine-granular iron that should be recovered is extremely small in the first slag. Thus, in particular, when the amount of the first slag is small, an economic burden is small even when the first slag and the second slag are crushed together as described above.

Figure 8:
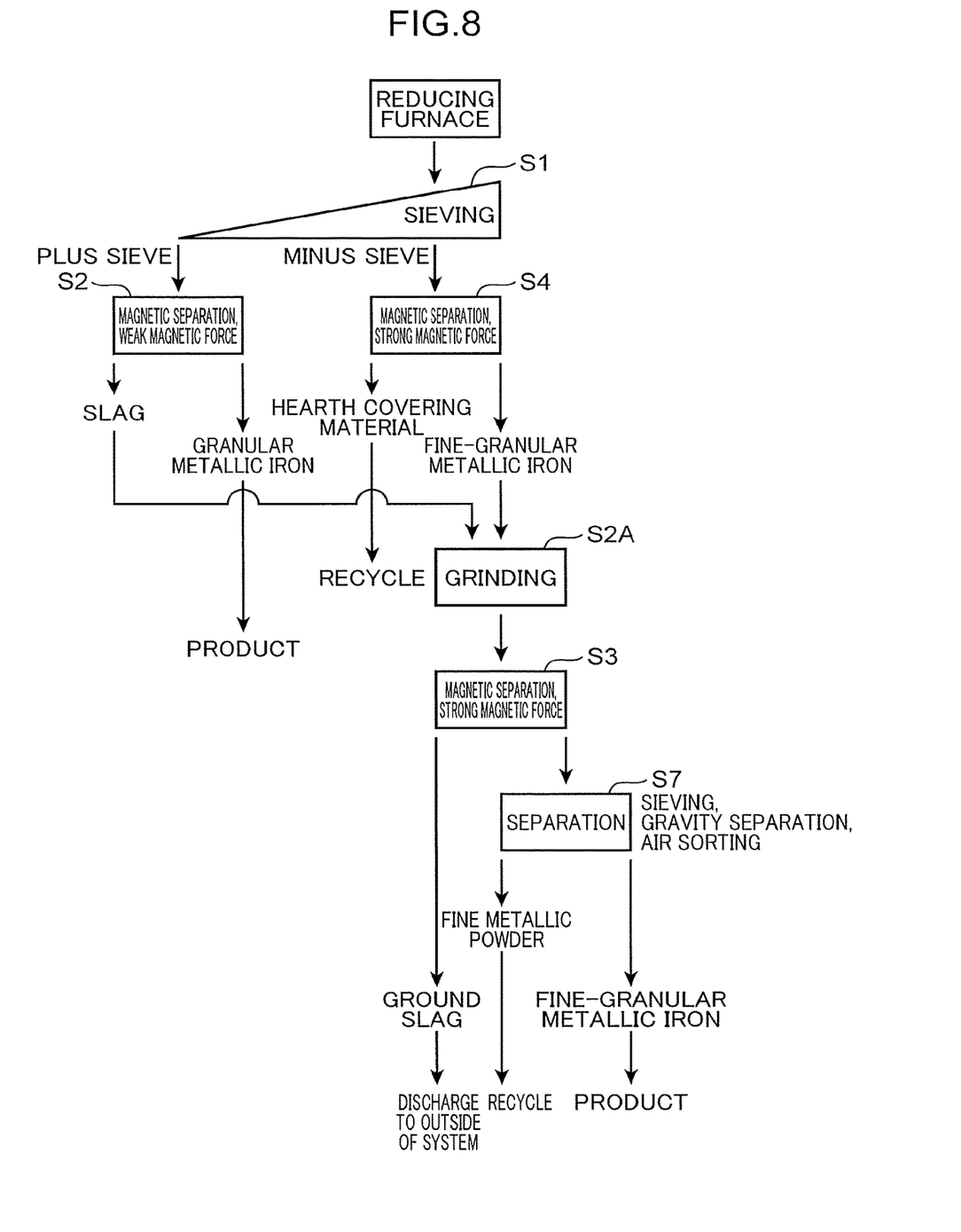
FIG. 8 is a flow chart illustrating a reduced iron production method according to a third modification of the embodiment.
Figure 9:
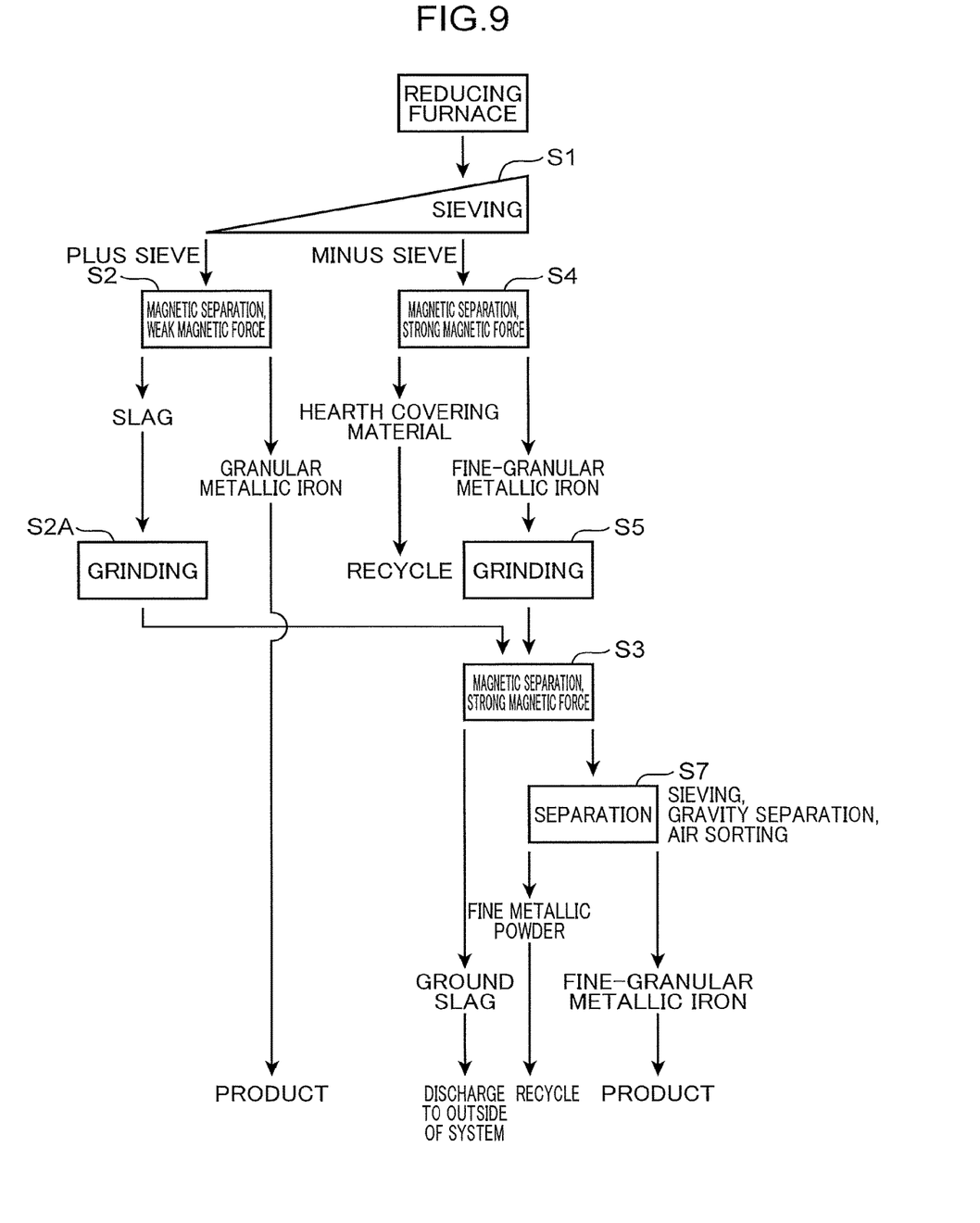
FIG. 9 is a flow chart illustrating a reduced iron production method according to a fourth modification of the embodiment.

FIGS. 8 and 9 are flow charts illustrating reduced iron production methods according to third and fourth modifications. According to the reduced iron production methods illustrated in FIGS. 8 and 9, a granular metallic iron containing substance containing the granular metallic iron F and a first slag containing substance including slag (that is, the slag S and the fine-granular iron containing slags FS1, FS2 in FIG. 7) are separated from each other by the first magnetic separator 11 having a weak magnetic force in step S2, and the slag is ground in a grinding step S2A. Then, in step S3, fine-granular metallic iron is separated from the ground slag by the second magnetic separator 12 having a strong magnetic force. Accordingly, it is possible to extract the fine-granular metallic iron.

Also in this case, the slag separated by the first magnetic separator 11 having a weak magnetic force in step S2 and the fine-granular metallic iron separated by the minus sieve magnetic separator 4 in step S4 can be ground by a common grinder in step S2A as illustrated in FIG. 8. When the grinding by the common grinder is not appropriate, grinding may be performed by different grinders in step S2A and step S5 as illustrated in FIG. 9.

As described above, the reduced iron production method and the reduced iron production apparatus that are capable of recovering high-purity metallic iron with high efficiency and reducing the load of equipment for crushing are provided.

The provided reduced iron production method includes: a reduction step of producing reduced iron by heating an agglomerate containing iron oxide and a carbonaceous reducing agent in a heating furnace to reduce the iron oxide, producing a product containing granular metallic iron, a first slag, and a second slag containing more fine-granular metallic iron than the first slag by melting the reduced iron, and then solidifying the product; a first magnetic separation step of separating, among the granular metallic iron and the second slag that are contained in the product, at least the granular metallic iron from the first slag by use of a first magnetic separator to separate a first slag containing substance containing the first slag and a granular metallic iron containing substance containing the granular metallic iron from each other; a second magnetic separation step of separating the second slag from a substance containing the second slag among the first slag containing substance and the granular metallic iron containing substance that are separated from each other by the first magnetic separation step by use of a second magnetic separator having an attraction force different from an attraction force of the first magnetic separator; and a crushing step of crushing the second slag.

According to this method, it is possible to separate the heat-molten product into the granular metallic iron, the first slag, and the second slag containing more fine-granular metallic iron than the first slag by performing the two-stage sorting on the product by use of the first and second magnetic separators having different attraction forces. Accordingly, it is possible to extract high-purity granular metallic iron as it is as a product without introducing the high-purity granular metallic iron into equipment for crushing. The second slag is crushed in order to recover fine-granular metallic iron contained in the second slag. However, since the second slag is easily crushed due to its hardness lower than the hardness of the granular metallic iron, a load applied to equipment for performing crushing such as a grinder is small. Thus, in the above production method, it is possible to achieve both efficient recovery of high-purity metallic iron and reduction of the load of the equipment which performs crushing by recovering the fine-granular metallic iron contained in the second slag together with the granular metallic iron.

Preferably, the above method further includes a recovery step of recovering metallic iron from the second slag crushed by the crushing step by use of a third magnetic separator. The recovery step makes it possible to more efficiently recover the fine-granular metallic iron contained in the second slag and further improve the recovery rate of metallic iron in cooperation with the crushing step.

Preferably, the attraction force of the first magnetic separator is set to be stronger than the attraction force of the second magnetic separator. The first magnetic separator having a strong attraction force in this manner separates a group of the granular metallic iron and the second slag from the first slag of the product, and the second magnetic separator having a weak attraction force then sorts the granular metallic iron and the second slag. Thus, it is possible to efficiently recover the high-purity metallic iron by the second magnetic separator in the second stage after separating and removing the first slag, which is an unnecessary substance, by the first magnetic separator in the first stage.

The attraction force of the first magnetic separator may be set to be weaker than the attraction force of the second magnetic separator. In this mode, the first magnetic separator having a weak attraction force separates the granular metallic iron from the first slag and the second slag. That is, a granular metallic iron containing substance and a first slag containing substance containing the second slag are produced. Thus, it is possible to increase the purity of granular iron by recovering the granular metallic iron by the first magnetic separator in the first stage. Further, it is possible to increase the recovery rate of an iron content by separating the second slag from the first slag containing substance by the second magnetic separator in the second stage.

Preferably, the crushing step includes crushing the first slag and the second slag between the first magnetic separation step and the second magnetic separation step. This makes it possible to extract fine-granular metallic iron contained in the crushed first slag and the crushed second slag by use of the second magnetic separator.

Preferably, each of the first magnetic separator and the second magnetic separator is a drum magnetic separator including a drum having a cylindrical shape and having an outer peripheral face where the magnetic force is generated and a drive unit that rotates the drum. In the first magnetic separator and the second magnetic separator each of which is the drum magnetic separator, the attraction force acting on the product on the outer peripheral face of the drum is the resultant force of a magnetic force acting on the product inward in the drum radial direction so as to attract the product to the outer peripheral face of the drum and a centrifugal force acting on the product outward in the drum radial direction along with the rotation of the drum. Thus, it is possible to change the attraction force of each of the first magnetic separator and the second magnetic separator in any manner by only changing the rotation speed of the drum.

Preferably, the above method further includes a step of separating the product having a predetermined outer diameter or larger, the product being included in a discharged material discharged from the heating furnace, from the other discharged material after the reduction step and before the first magnetic separation step. The separation of the product makes it possible to prevent a reduction in the separation efficiency of the first magnetic separator and the second magnetic separator, the reduction being caused by the product. Specifically, the discharged material discharged from the heating furnace contains a large amount of fine powder, such as hearth covering charcoal and fine-granular metallic iron, the fine powder being smaller than the product. However, it is possible to reduce the amount of fine powder fed to the first magnetic separator and the second magnetic separator by separating the product having a predetermined outer diameter or larger from the fine powder as described above. This makes it possible to prevent fine metal powder considerably smaller than granular metallic iron to be a product from being got into an electric furnace for melting metallic iron in aftertreatment and introduce only granular metallic iron having a size that is easy to handle and suitable for melting in the electric furnace into the electric furnace. The fine powder may be attracted to exhaust air for dust collection when introduced into the electric furnace, which may deteriorate yield. Even if the fine powder is introduced into the electric furnace, the fine powder is easily caught by a molten slag layer on molten metal and resists melting into the molten metal in the electric furnace. Thus, the yield is still deteriorated. Thus, the fine powder is not suitable as a raw material for electric furnace. Further, the above separation prevents hearth covering charcoal having a smaller specific gravity and a larger volume than iron from being fed to the first magnetic separator and the second magnetic separator. This prevents a reduction in the separation efficiency of the first magnetic separator and the second magnetic separator.

Further, the reduced iron production apparatus capable of carrying out the above production method is provided. The apparatus includes: a heating furnace that produces reduced iron by heating an agglomerate containing iron oxide and a carbonaceous reducing agent to reduce the iron oxide, produces a product containing granular metallic iron, a first slag, and a second slag containing more fine-granular metallic iron than the first slag by melting the reduced iron, and then solidifies the product; a first magnetic separator that separates, among the granular metallic iron and the second slag that are contained in the product, at least the granular metallic iron from the first slag to separate a first slag containing substance containing the first slag and a granular metallic iron containing substance containing the granular metallic iron from each other; a second magnetic separator that is disposed on a downstream side of the first magnetic separator and separates the second slag from a substance containing the second slag among the first slag containing substance and the granular metallic iron containing substance that are separated from each other by the first magnetic separator by an attraction force different from an attraction force of the first magnetic separator; and a crushing unit that crushes at least the second slag.

In this apparatus, it is possible to separate the granular metallic iron, the first slag, and the second slag containing more fine-granular metallic iron than the first slag from the heat-molten product by performing the two-stage sorting on the product by the first and second magnetic separators having different attraction forces. Accordingly, it is possible to prevent the granular metallic iron from being introduced into equipment for crushing and extract high-purity granular metallic iron as it is as a product. On the other hand, the second slag is crushed by the crushing unit in order to recover fine-granular metallic iron contained in the second slag. However, since the second slag is easily crushed due to its hardness lower than the hardness of the granular metallic iron, a load applied to the crushing unit by the crushing is small. Thus, in this apparatus, it is possible to achieve both efficient recovery of high-purity metallic iron and reduction of the load of the crushing unit by recovering the fine-granular metallic iron contained in the second slag together with the granular metallic iron.

Preferably, the above apparatus further includes a third magnetic separator that recovers fine-granular metallic iron contained in the second slag crushed by the crushing unit. Recovering the fine-granular metallic iron contained in the second slag in this manner makes it possible to improve the recovering efficiency of metallic iron.

The invention claimed is:

1. A reduced iron production method, comprising, in the order listed:
   (i) producing reduced iron by heating an agglomerate containing iron oxide and a carbonaceous reducing agent in a heating furnace to reduce the iron oxide, producing a product containing reduced iron, melting the reduced iron, and then solidifying the reduced iron to obtain a product comprising granular metallic iron, a first slag having less than 3 weight % of a fine granular metallic iron, and a second slag containing from 3 weight % to 15 weight % of fine-granular metallic iron, wherein the first slag and the second slag are separable by magnetic force;
   (ii) separating the granular metallic iron from the first slag with a first magnetic separator, wherein the second slag is optionally retained with the granular metallic iron or the first slag depending on the magnetic attraction force of the first magnetic separator;
   (iii) separating the second slag from the first-slag or the granular-metallic-iron with a second magnetic separator having an attraction force different from the attraction force of the first magnetic separator; and
   (iv) crushing the separated second slag;
   wherein the product obtained by melting and solidifying the reduced iron is not crushed and the granular metallic iron is removed as a product without grinding.

2. The reduced iron production method according to claim 1, further comprising
   recovering metallic iron from the crushed second slag with a third magnetic separator.

3. The reduced iron production method according to claim 1, wherein the attraction force of the first magnetic separator is set to be stronger than the attraction force of the second magnetic separator and the second slag is retained with the granular metallic iron.

4. The reduced iron production method according to claim 1, wherein the attraction force of the first magnetic separator is set to be weaker than the attraction force of the second magnetic separator, and the second slag is retained with the first slag.

5. The reduced iron production method according to claim 4, further comprising crushing the first slag and the second slag between (ii) and (iii).

6. The reduced iron production method according to claim 1, wherein each of the first magnetic separator and the second magnetic separator is a drum magnetic separator including a drum having a cylindrical shape and having an outer peripheral face where the magnetic force is generated and a drive unit that rotates the drum.

7. The reduced iron production method according to claim 1, further comprising separating hearth covering charcoal from the material obtained in (i) before the separating in (ii).

* * * * *